March 27, 1951 R. HOLLE 2,546,303
TAG FASTENER
Filed Jan. 8, 1948
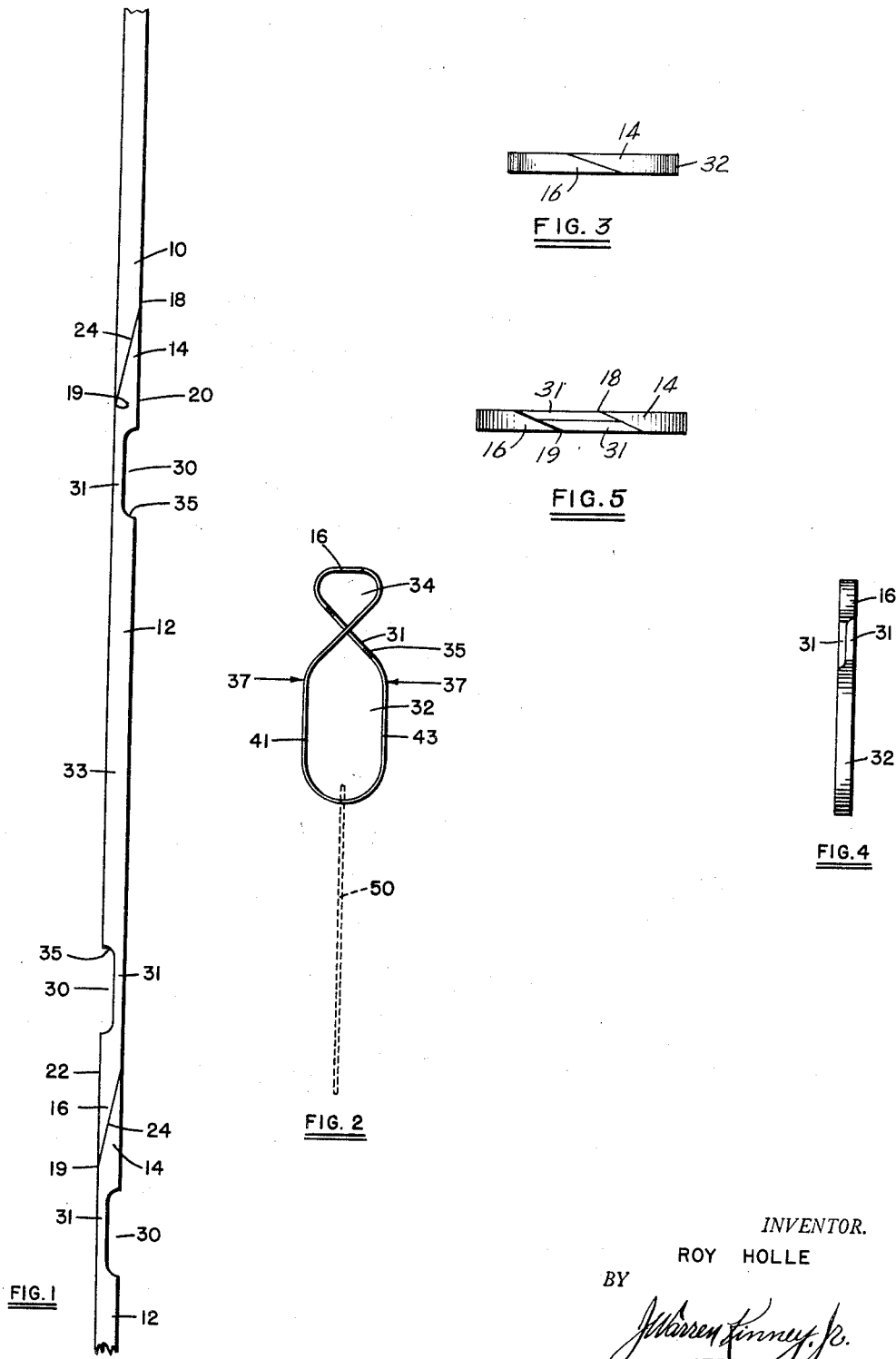
INVENTOR.
ROY HOLLE
BY
*J. Warren Kinney, Jr.*
ATTORNEY Patented Mar. 27, 1951

2,546,303

UNITED STATES PATENT OFFICE 2,546,303

TAG FASTENER

Roy Holle, Cincinnati, Ohio, assignor to The Fleischer Mills, Inc., Cincinnati, Ohio, a corporation of Ohio Application January 8, 1948, Serial No. 1,123

1 Claim. (Cl. 40—24)

This invention relates to fasteners, and more particularly to fasteners of the type used for temporarily and releasably attaching identification tags, or the like, to various articles, such as by way of example, wearing apparel.

An object of the invention is to provide a fastener or clip which is fabricated from a length of relatively thin flat stock, the ends of which are cut or otherwise formed in such a manner as to provide a highly efficient piercing point. Heretofore it has been customary to produce fasteners from round, rectangular or square stock and wherein a sharpening operation was required in order to provide piercing points on the jaws of the fasteners fabricated therefrom. In my fastener I completely eliminate the need of a special operation for providing piercing points on the clamping jaws of a fastener.

Another object of the invention is to provide a fastener including a pair of separable jaw members, each of which are provided with piercing portions which are complementary to one another; said piercing portions providing an initial double piercing effect whereby the fastener may be quickly and securely attached to a supporting member.

Still a further object of the invention is to provide a fastener having a figure 8 contour comprising an upper and lower loop, wherein the upper loop comprises a pair of longitudinally separable jaw elements and wherein the lower loop provides adequate support for a tag, or the like, which may be suspended therefrom.

Still a further object of the invention is to provide a fastener which is fabricated from thin flat stock and wherein the fastener is provided with elongated notches in opposite sides of the strip of stock, each notch being disposed adjacent an end of the fastener and so related to an adjacent piercing point as to cooperate therewith for precluding accidental or unintentional lateral separation of the jaws of the fastener element incident to use thereof.

Another object of the invention is to provide a fastener having the hereinabove described characteristics which includes means for limiting the full open or extended position of the jaws without resorting to auxiliary loops or other mediums which not only require more stock than my fastener requires but which likewise increase the overall width and thickness dimensions thereof.

Still a further object of the invention is to provide a fastener having the hereinabove described characteristics which may be inexpensively fabricated using modern mass production methods, and which fasteners are particularly adapted to be boxed without becoming intertwined or tangled with other fasteners housed in the same box.

These and other objects are attained by the means described herein and as disclosed in the accompanying drawings, in which:

Fig. 1 is a plan of a length of thin flat stock formed to provide a blank from which a fastener of the present invention may be fabricated.

Fig. 2 is a side view of a fastener made from the blank of Fig. 1.

Fig. 3 is a top view of the fastener of Fig. 2.

Fig. 4 is a side view of the fastener of Fig. 2.

Fig. 5 is a view similar to Fig. 3 but showing the jaws in an opened or extended position.

With reference to Fig. 1, the numeral 10 indicates generally a length of thin flat tempered steel which may, by way of example, have a width dimension of approximately $\frac{3}{32}$ of an inch and a thickness of from 25 to 30 U. S. Standard gauge. The numeral 12 indicates generally a blank formed in accordance with the teachings of the present invention and from which the fasteners may be fabricated. The blank is provided at its opposite ends with complementary tapered jaws or piercing portions 14 and 16, wherein the apexes 18 and 19 of said piercing portions are located in opposite edges of strip 10; apex 18 of piercing portion 14 being disposed in edge 20, whereas apex 19 of piercing portion 16 is located in edge 22.

In the preferred embodiment of the invention, the jaws comprise a pair of right triangular shaped piercing elements 14 and 16 the respective apexes of which are located in opposite edges of strip 12. As illustrated in Fig. 1, the hypotenuse, or inclined edge 24, of each of said piercing elements are complementary and are disposed at such an angle as to provide a long gradual taper for providing a piercing point having such characteristics as to enable it to readily penetrate woven materials without cutting or severing the threads thereof.

An elongated notch or cut-away portion 30 is provided in each edge of the strip, one being disposed adjacent each piercing portion and being located in the same edge as the apexes of the adjacent piercing portion. The numeral 31 indicates the intermediate narrow portions between body portion 33 and the piercing portions 14 and 16.

As clearly indicated in Fig. 1 a pair of complementary piercing portions are provided in successive fasteners with each diagonal cut 24 of the strip material 10, thereby greatly facilitating ease and rapidity of production.

With reference now to Fig. 2, it will be observed that blank 12 may be bent or otherwise formed in such a manner as to provide a lower closed loop 32 and then crossed to provide an upper or reverse loop or jaw portion 34. The lower loop 32 is formed from the body material intermediate notches 30, it being understood that the upper ends of lower loop 32 are crossed at the narrowed portions 31 whereby to provide the structure disclosed in Figs. 2 and 4.

With reference now to Figs. 2 and 3, it will be noted that complementary tapered portion 24 of the jaws or piercing elements 14 and 16 are normally and yieldably disposed in a closed, abutting co-planar, side-by-side relationship by reason of the resilient characteristics of loop 32. It will likewise be observed that those crossed portions of the fastener as defined by narrow portions 31 will cooperate to preclude lateral separation of jaw members 14 and 16 when said jaws have been opened to facilitate the insertion of a support member therebetween. The tapered portion 24 of each jaw is likewise so related to its respective and adjacent elongated notch portions and to the complementary taper of one another as to preclude accidental or unintentional lateral separation of the jaws incident to the nominal usage to which such fasteners are customarily subjected.

In the preferred embodiment of the invention the depth dimension of each of elongated notches 30 is approximately ½ of the overall width of strip 10, whereby the maximum width of a fastener is of a dimension approximating the overall width of the flat stock 10 from which the blanks are formed, as illustrated in Figs. 3 and 4.

A tag, or other suitable identification member 50 may be suspended from lower loop 32. Such a tag may be attached to the fastener by opening jaws thereof for the purpose of threading one or the other of said jaws thru an aperture in an end of the tag. Then, by flexing the crossed portions of the fastener, while the jaws are maintained in an open or extended position, the tag may be slid or threaded onto the lower loop to the position indicated in Fig. 2.

When the fastener has been manipulated to effect an opening or longitudinal, axial separation of piercing points 14 and 16, see Fig. 5, a pair of laterally spaced piercing points are presented, each of which will piercingly engage material inserted therebetween upon release of the open jaws. If said jaws are further urged together the material initially located between the laterally spaced piercing points of jaws 14 and 16 will be laterally displaced, thereby effecting a substantial bearing surface from which the fastener may be suspended.

I have found that no sharpening or pointing operation is required with my type of fastener, since the thickness of the stock and the long taper of the piercing portions 14 and 16 provide an efficient fabric engaging member which will separate rather than pierce or rupture the fibers or filaments from which the fabric is woven incident to attachment of a fastener thereto.

It should be noted that the maximum amount by which the piercing jaws may be longitudinally opened or separated, incident to the application of a squeezing force or pressure applied in a direction indicated generally by the headed arrows 37 of Fig. 2, will be determined by the spacing and location of the adjacent ends 35 of the notches of each fastener. For convenience of understanding adjacent ends 35 may be considered as stop or abutment members which are provided in that end of each notch remote from its associated piercing portion. With reference to Fig. 5, it will be noted that the full open position of jaws 14 and 16 has been determined by contact of stops or abutment portions 35.

It should be understood that the illustrated contour of stops or abutments 35 is exemplary in nature rather than restrictive. It has been found that there is no tendency for the legs 41 and 43 of a fastener to become laterally separated during those periods of time when the jaws are in the fully extended position illustrated in Fig. 5, incident to normal usage of a fastener, due in part to the structural characteristics inherent in tempered steel, and in part to the shape of blank 12, including its elongated notch portions 30, the depth of each of which are preferably at least fifty percent (50%) of the overall width of the strip of stock from which the fastener is fabricated.

It should be understood that various modifications and changes in the structural details of the device may be made, within the scope of the appended claim, without departing from the spirit of the invention. In this connection, it is to be noted that whereas I have described my fastener as being fabricated from a length of thin flat tempered steel such description is exemplary rather than restrictive, since I have successfully fabricated fasteners from other types of materials other than tempered steel, such as phosphorous bronze, and the like. I likewise contemplate fabricating fasteners from thin sheets of suitable plastics wherein the plastics are selected from that class which are characterized by inherent resiliency of the type hereinabove described.

What is claimed is:

A tag fastener fabricated from a single flat strip of resilient metal having substantially U-shaped notches cut therein on each side of the longitudinal axis adjacent each end, each end being cut beyond the notches on a diagonal to the longitudinal axis forming pointed ends in the shape of right angle triangles with the hypotenuse being the diagonal, the strip being bent to form substantially a figure 8 with the notches meeting at the closure of the lower loop, the notches being so shaped that the strip at the closure of the second loop is of substantially the same width as the rest of the strip forming the lower loop, the hypotenuse of each of the ends meeting and mating to form the closure of the upper loop, the pointed ends being adapted to pierce a supporting object to which the tag is to be fastened and the notches limiting the amount of opening of the pointed ends when the sides of the lower loop are brought towards each other.

ROY HOLLE.

REFERENCES CITED

The following references are of record in the file of this patent:

UNITED STATES PATENTS

| Number | Name | Date |
|---|---|---|
| 66,968 | Kendig | July 23, 1867 |
| 70,834 | Grushus | Nov. 12, 1867 |
| 505,726 | Scott | Sept. 26, 1893 |
| 1,133,334 | Strycker | Mar. 30, 1915 |
| 1,373,493 | Dye | Apr. 5, 1921 |
| 1,443,224 | Kolbe | Jan. 23, 1923 |
| 1,491,627 | Probst | Apr. 22, 1924 |
| 1,927,732 | Bailey | Sept. 19, 1933 |
| 2,159,026 | Jacobson | May 23, 1939 |